Patented Nov. 14, 1950

2,529,482

UNITED STATES PATENT OFFICE 2,529,482

3-METHYL-HEXEN(2)-YNE(5) DERIVATIVES

Albert Businger, Basel, Switzerland, assignor to Hoffmann-La Roche Inc., Nutley, N. J., a corporation of New Jersey No Drawing. Application June 18, 1947, Serial No. 755,473. In Switzerland April 12, 1946

Section 1, Public Law 690, August 8, 1946
Patent expires April 12, 1966

4 Claims. (Cl. 260—488)

It has been found, according to the present invention, that certain new compounds, i. e., 1-hydroxy-3-methyl-hexene-(2)-yne-(5) and certain derivatives thereof, are valuable intermediates for the synthesis of vitamin A active compounds. They correspond to the following formula:

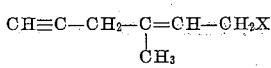

wherein the symbol X stands for a hydroxy, halogeno, acetoxy or methoxy radical. The said compounds may be manufactured by subjecting 3-hydroxy-3-methyl-hexene-(1)-yne-(5) to an allyl rearrangement. The means which are employed for this purpose may cause certain other chemical changes, as described below, with respect to the hydroxy group in the starting material, in the same reaction step in which the allyl rearrangement occurs. Furthermore, the terminal functional radical of the compound obtained by the rearrangement-step may subsequently be transformed as described below.

The starting material, the 3-hydroxy-3-methyl-hexene-(1)-yne-(5), may be prepared in the following manner:

1 mole of propinyl-bromide and 2-4 moles of dry methyl-vinylketone in benzene solution are condensed by the aid of 1-3 moles of zinc powder at boiling temperature under the usual conditions of a Reformatsky-reaction. The zinc compound formed is decomposed with an acid and the solvent driven off. From the viscous residue 3-hydroxy-3-methyl-hexene-(1)-yne-(5) of boiling point 44–47° C. (under a pressure of 12 mm. Hg) may be distilled in good yield. $n_D^{20°}=1.460$. $d_4^{18°}=0.916$.

For effecting the allyl rearrangement (Hückel, Theoretische Grundlagen der organischen Chemie, Leipzig 1943, 4th edition, vol. I, pages 297–298 &c.) a method must be elected which avoids, as far as possible, the undesired splitting off of water prior to the rearrangement. It is suitable to esterify 3-hydroxy-3-methyl-hexene-(1)-yne-(5) by treatment with an organic acylating agent or with a phosphorus-halide, during which operation the allyl rearrangement of the major part occurs simultaneously with the esterification and, partially, by subsequent heating. The allyl rearrangement consists of a migration of the functional group from position 3 into position 1, and of the double-bond from position 1 into position 2. Thus, 1-acetoxy-3-methyl-hexene-(2)-yne-(5) is formed by boiling 3-hydroxy-3-methyl-hexene-(1)-yne-(5) with acetic anhydride. By hydrolysation under mild conditions, for instance, by boiling with a Grignard-solution, the said acetoxy-compound may be transformed into 1-hydroxy-3-methyl-hexene-(2)-yne-(5). The corresponding ester of hydrobromic acid, i. e., 1-bromo-3-methyl-hexene-(2)-yne-(5), is obtained by treating 3-hydroxy-3-methyl-hexene-(1)-yne-(5) with phosphorus-tribromide. The said bromo-compound may be transformed into 1-methoxy-3-methyl-hexene-(2)-yne-(5) by treatment of a methyl-alcoholic solution of the former with an acid-binding agent, such as sodium, potassium carbonate, &c. The said methyl-ether is also formed by boiling 1-acetoxy-3-methyl-hexene-(2)-yne-(5) in methyl-alcoholic solution.

Example 1

13.6 parts by weight of phosphorus-tribromide in 20 parts by volume of ether are added, during the course of 30 minutes at —10° C., while stirring, to a mixture of 8.2 parts by weight of 3-hydroxy-3-methyl-hexene-(1)-yne-(5) with 30 parts by volume of ether. After completion of the addition, stirring is continued for 30 minutes, then the reaction solution is poured on to 100 parts by weight of ice. The reaction product is taken up in ether, washed with water, dried with sodium sulfate and concentrated. 12.5 to 13 parts by weight of 1-bromo-3-methyl-hexene-(2)-yne-(5) are obtained. Yield: 95–98 per cent.

In order to transform the latter compound into the corresponding methyl-ether, the bromo-compound is dissolved in 15 parts by volume of methyl-alcohol and this solution is added, in the course of 15 minutes at —10° C. while stirring, to a solution of 2.5 parts by weight of sodium in 40 parts by volume of methyl-alcohol. The mixture is then heated to 20° C. and stirred for another 15 minutes. 60 parts by volume of ice-water are then added; after acidification with dilute sulfuric acid, the reaction product is taken up in pentane and washed with water. The residue obtained aftre driving off the solvent is fractionated. 1 - methoxy - 3 - methyl-hexene-(2)-yne-(5), a clear solution of $$n_D^{20}=1.460 \text{ and } d_4^{18°}=0.916$$

distills over at a temperature of 44–47° C. under a pressure of 12 mm. Hg.

The benzyl-ether is prepared in analogous manner. The phenyl-ether may be obtained in good yield by boiling 1-bromo-3-methyl-hexene-(2)-yne-(5) with phenol in acetone, in the presence of potassium carbonate. Likewise, the methyl-ether is obtainable by boiling the bromo-compound in methyl alcohol with potassium carbonate.

*Example 2*

2 parts by weight of 3-hydroxy-3-methyl-hexene-(1)-yne-(5) are mixed with 8 parts by volume of acetic anhydride and refluxed for 2 hours. After driving off the excess acetic anhydride, the residue is fractionated in vacuo. 1-acetoxy-3-methyl-hexene-(2)-yne-(5) boils at 56–57° C. under a pressure of 12 mm. Hg. It is a clear liquid of $n_D^{20}=1.450$ and $d_4^{16°}=0.968$. Yield: 80–90 per cent.

*Example 3*

3.87 parts by weight of 1-acetoxy-3-methyl-hexene-(2)-yne-(5) in 40 parts by volume of ether are caused to flow, in the course of 15 minutes, into a boiling ethyl-magnesium-bromide solution, prepared from 3 parts by weight of magnesium, 13.5 parts by weight of ethyl-bromide and 50 parts by volume of ether. The mixture is refluxed for 30 minutes and then poured on to a mixture of ammonium-chloride with ice in order to bring about hydrolysation of the magnesium compound formed. The alcohol, which is thus obtained, is taken up in ether, the ethereal solution is washed with water, dried with potassium carbonate and concentrated. During fractionation of the residue, 1-hydroxy-3-methyl-hexene-(2)-yne-(5), boiling at 68–70° C. under a pressure of 15 mm. Hg is obtained. It is a clear oil of $n_D^{18}=1.448$ and $d_4^{17°}=0.874$.

I claim:
1. Compounds of the formula

$$CH{\equiv}C{-}CH_2{-}\underset{\underset{CH_3}{|}}{C}{=}CH{-}CH_2X$$

wherein X is selected from the group consisting of hydroxy, halogeno, acetoxy and methoxy radicals.
2. 1-acetoxy-3-methyl-hexene-(2)-yne-(5).
3. 1-hydroxy-3-methyl-hexene-(2)-yne-(5).
4. 1-methoxy-3-methyl-hexene-(2)-yne-(5).

ALBERT BUSINGER.

REFERENCES CITED

The following references are of record in the file of this patent:

UNITED STATES PATENTS

| Number | Name | Date |
|---|---|---|
| 2,369,157 | Milas | Feb. 13, 1945 |
| 2,369,159 | Milas | Feb. 13, 1945 |

OTHER REFERENCES

Favorskaya, Chem. Abst., vol. 39, page 4047 (1945).

Jones, Jour. Chem. Soc., London 1943, pages 261–264.